United States Patent
Mazuir et al.

(10) Patent No.: US 11,833,959 B1
(45) Date of Patent: Dec. 5, 2023

(54) SYSTEM AND METHOD FOR ADJUSTABLE LIGHTING

(71) Applicant: Apple Inc., Cupertino, CA (US)

(72) Inventors: Clarisse Mazuir, San Jose, CA (US);
Arthur Y. Zhang, San Jose, CA (US);
Matthew E. Last, San Jose, CA (US);
Budhadipta Dan, San Jose, CA (US);
Christy F. Cull, Sunnyvale, CA (US);
Ryan J. Garrone, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 346 days.

(21) Appl. No.: 17/173,840

(22) Filed: Feb. 11, 2021

Related U.S. Application Data

(63) Continuation of application No. 16/669,897, filed on Oct. 31, 2019, now Pat. No. 10,940,790, which is a
(Continued)

(51) Int. Cl.
*B60Q 1/14* (2006.01)
*F21V 14/04* (2006.01)
(Continued)

(52) U.S. Cl.
CPC ............ *B60Q 1/1423* (2013.01); *B60Q 3/51* (2017.02); *F21V 5/04* (2013.01); *F21V 14/04* (2013.01);
(Continued)

(58) Field of Classification Search
CPC ... B60Q 3/47; B60Q 3/80; B60Q 9/00; B60Q 3/43; B60Q 3/44; B60Q 3/18; B60Q 1/0011; B60Q 1/04; B60Q 1/085; B60Q 1/1423; B60Q 1/2603; B60Q 1/2607; B60Q 1/2696; B60Q 1/444; B60Q 1/52;
(Continued)

(56) References Cited

U.S. PATENT DOCUMENTS 5,025,602 A 6/1991 Baughman et al.
5,390,045 A 2/1995 Bernard, Jr.
(Continued)

FOREIGN PATENT DOCUMENTS

DE 102011009229 A1 7/2012
WO 2014/108771 A2 7/2014

OTHER PUBLICATIONS

Siler, W.,, "Mercedes Dual-View Front Seat Screen Finally US-Bound", Jalopnik, Car Gadgets, Dec. 9, 2009 (8 pages).

*Primary Examiner* — Monica C King
(74) *Attorney, Agent, or Firm* — Young Basile Hanlon & MacFarlane, P.C.

(57) ABSTRACT

A lighting module comprising lighting elements and a controller configured to receive a control signal that identifies a user as present. In response to the control signal associated with user presence, the lighting module is configured to send a command to one or more of the lighting elements to illuminate a first zone where the user is present. The lighting module is configured to receive a control signal that identifies that illumination of a second zone was previously requested by the user at a current location, and in response to the control signal associated with the current location, send a command to one or more of the lighting elements to illuminate the second zone.

20 Claims, 8 Drawing Sheets

Related U.S. Application Data continuation of application No. 15/366,733, filed on Dec. 1, 2016, now abandoned.

(60) Provisional application No. 62/350,827, filed on Jun. 16, 2016, provisional application No. 62/261,772, filed on Dec. 1, 2015.

(51) Int. Cl.

| | | |
|---|---|---|
| *F21V 5/04* | (2006.01) | |
| *H05B 47/105* | (2020.01) | |
| *H05B 45/10* | (2020.01) | |
| *B60Q 3/51* | (2017.01) | |
| *F21Y 115/10* | (2016.01) | |
| *G06F 3/04883* | (2022.01) | |
| *H04N 7/18* | (2006.01) | |
| *G06V 20/56* | (2022.01) | |
| *G06V 20/59* | (2022.01) | |
| *G06V 40/20* | (2022.01) | |
| *G06V 40/70* | (2022.01) | |
| *G06V 20/05* | (2022.01) | |

(52) U.S. Cl.
CPC ........... *H05B 45/10* (2020.01); *H05B 47/105* (2020.01); *F21Y 2115/10* (2016.08); *G06F 3/04883* (2013.01); *G06V 20/05* (2022.01); *G06V 20/597* (2022.01); *G06V 40/20* (2022.01); *G06V 40/70* (2022.01); *H04N 7/181* (2013.01)

(58) Field of Classification Search
CPC ........ B60Q 2300/054; B60Q 2300/112; B60Q 2300/116; B60Q 2300/122; B60Q 2300/134; B60Q 2300/142; B60Q 2300/21; B60Q 2300/23; B60Q 2300/312; B60Q 2300/314; B60Q 2300/322; B60Q 2300/41; B60Q 2300/42; B60Q 2400/20; B60Q 2400/50; B60Q 2900/50; B60Q 3/12; B60Q 3/16; B60Q 1/507; B60Q 1/544; B60Q 2300/45; B60Q 2300/47; B60Q 2900/30; B60Q 3/14; B60Q 3/20; B60Q 3/72; B60R 1/088; B60R 11/04; B60R 25/00; B60R 25/01; B60R 25/1004; B60R 25/102; B60R 25/20; B60R 25/2081; B60R 25/25; B60R 25/257; B60R 21/01512; B60R 21/01554; B60R 2300/8013; B60R 21/01546; B60R 21/0132; H05B 47/115; H05B 47/125; H05B 47/11; H05B 45/20; H05B 45/395; H05B 47/19; H05B 3/008; H05B 45/12; H05B 47/105; H05B 47/175; H05B 45/00; H05B 45/10; H05B 45/18; H05B 45/24; H05B 45/325; H05B 45/37; H05B 45/46; H05B 45/48; H05B 45/56; H05B 47/00; H05B 47/10; H05B 47/12; H05B 47/155; H05B 47/16; H05B 47/18; H05B 47/195; H05B 47/185; H05B 3/342; H05B 47/22; H05B 45/22; H05B 47/165; H05B 2203/036; H05B 3/34; H05B 45/44; H05B 45/357; H05B 45/60; F21K 9/232; F21K 9/23; F21K 9/238; F21K 9/235; F21K 9/65; F21K 9/68; F21K 9/69; F21K 9/278
See application file for complete search history.

(56) References Cited

U.S. PATENT DOCUMENTS

| | | |
|---|---|---|
| 5,834,765 A | 11/1998 | Ashdown |
| 6,819,367 B1 | 11/2004 | Cava |
| 6,974,940 B2 | 12/2005 | Su et al. |
| 7,576,727 B2 | 8/2009 | Bell |
| 8,044,784 B2 | 10/2011 | Ghannam et al. |
| 8,102,586 B2 | 1/2012 | Albahri |
| 8,380,393 B1 | 2/2013 | Ohtomo |
| 8,608,317 B2 | 12/2013 | Babst et al. |
| 8,707,216 B2 | 4/2014 | Wilson |
| 10,048,560 B1* | 8/2018 | Mazuir .................. G02B 6/001 |
| 10,843,535 B1 | 11/2020 | Mazuir et al. |
| 10,940,790 B1* | 3/2021 | Mazuir .................. F21V 14/04 |
| 11,059,417 B2* | 7/2021 | Salter ..................... G06F 3/013 |
| 2003/0209893 A1* | 11/2003 | Breed ................ B60R 21/01536 |
| | | 701/45 |
| 2003/0210355 A1 | 11/2003 | Dao |
| 2007/0176402 A1* | 8/2007 | Irie ........................ G06V 40/10 |
| | | 382/224 |
| 2008/0112175 A1* | 5/2008 | Bucher .................... B60Q 3/74 |
| | | 362/490 |
| 2008/0310850 A1* | 12/2008 | Pederson ......... G08B 13/19671 |
| | | 398/135 |
| 2009/0021955 A1 | 1/2009 | Kuang et al. |
| 2009/0046538 A1* | 2/2009 | Breed ................... B60R 25/102 |
| | | 706/20 |
| 2010/0014711 A1 | 1/2010 | Camhi et al. |
| 2010/0295670 A1* | 11/2010 | Sato ........................ B60Q 3/12 |
| | | 340/458 |
| 2011/0008062 A1* | 1/2011 | Ashdown ............. H04B 10/116 |
| | | 359/291 |
| 2011/0090681 A1 | 4/2011 | Hobson et al. |
| 2012/0206050 A1* | 8/2012 | Spero .................... B60Q 1/1423 |
| | | 315/152 |
| 2012/0299476 A1 | 11/2012 | Roberts et al. |
| 2013/0016070 A1 | 1/2013 | Starner et al. |
| 2013/0030645 A1 | 1/2013 | Divine et al. |
| 2013/0236183 A1 | 9/2013 | Chao et al. |
| 2014/0252961 A1* | 9/2014 | Ramer .................. H05B 47/165 |
| | | 315/307 |
| 2014/0276090 A1 | 9/2014 | Breed |
| 2014/0320755 A1 | 10/2014 | Martinez et al. |
| 2015/0023019 A1 | 1/2015 | Chen |
| 2015/0077555 A1 | 3/2015 | Scalisi |
| 2015/0253594 A1 | 9/2015 | Roberts et al. |
| 2015/0353006 A1* | 12/2015 | Jolda ....................... B60Q 3/14 |
| | | 315/77 |
| 2016/0152178 A1* | 6/2016 | Peterson ................. B60Q 3/80 |
| | | 315/77 |
| 2016/0207454 A1 | 7/2016 | Cuddihy et al. |
| 2016/0250985 A1 | 9/2016 | Ricci |
| 2016/0353551 A1 | 12/2016 | Despres |
| 2017/0073075 A1* | 3/2017 | Gagnon .................. H05B 47/11 |
| 2017/0088036 A1* | 3/2017 | Roeckl .................. F21S 41/143 |
| 2020/0148098 A1* | 5/2020 | Salter ..................... B60Q 1/245 |

\* cited by examiner

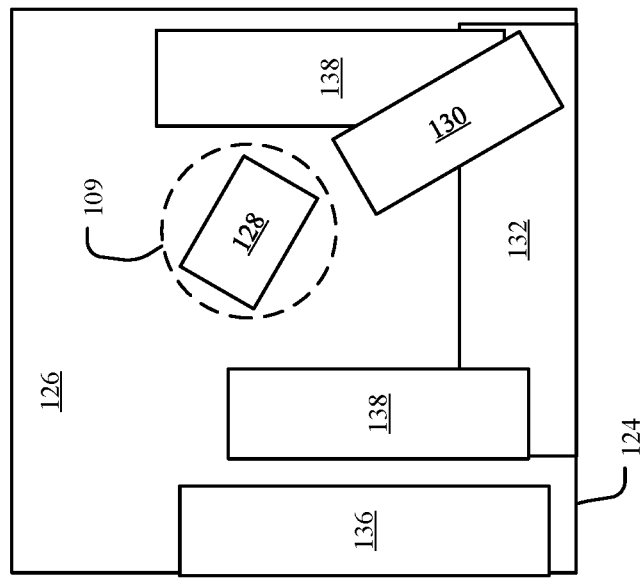
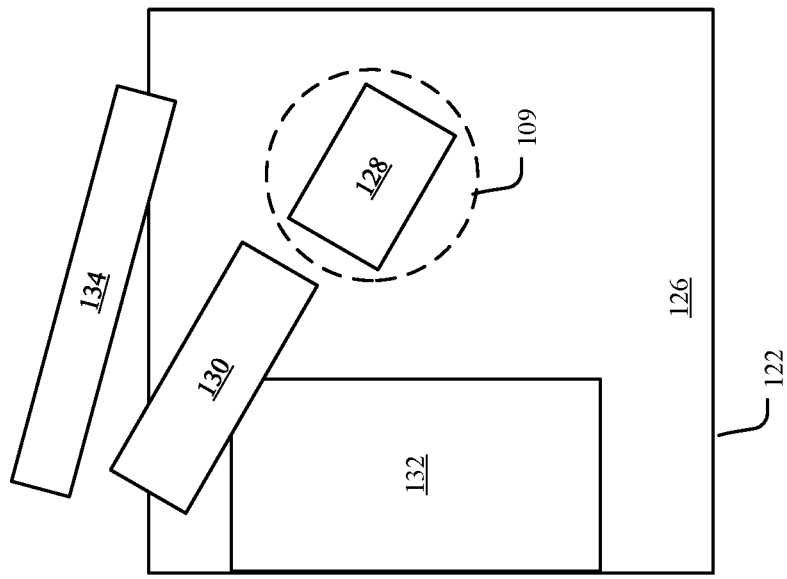
*FIG. 1E*

SYSTEM AND METHOD FOR ADJUSTABLE LIGHTING

CROSS-REFERENCE TO RELATED APPLICATIONS

This application is a continuation of U.S. patent application Ser. No. 16/669,897 filed Oct. 31, 2019, which is a continuation of U.S. patent application Ser. No. 15/366,733 filed Dec. 1, 2016, which is related to and claims priority under 35 U.S.C. § 119(e) to U.S. Patent Application No. 62/350,827, filed Jun. 16, 2016, entitled "SYSTEM AND METHOD FOR ADJUSTABLE LIGHTING" and U.S. Patent Application No. 62/261,772, filed Dec. 1, 2015, entitled "SYSTEM AND METHOD FOR ADJUSTABLE LIGHTING," the entire contents of which are incorporated herein by reference.

FIELD

The described embodiments relate generally to a lighting environment. More particularly, the embodiments relate to adjustable and dynamic lighting within a lighting environment.

BACKGROUND

Conventional interior lights are static and typically occupants have to control the lights using a switch or a physical button. A conventional interior light may only illuminate a limited area while failing to illuminate large swaths of the interior. As an example, the occupant may be attempting to find an object dropped onto the floor at night. When the occupant turns on a light mounted on the roof, the light may not be helpful because the occupant's body may create a shadow or the light may not illuminate a correct location. Objects also may be difficult to view based on limited lighting options in the interior. In short, conventional lighting would benefit from many improvements.

SUMMARY

A system includes a vehicle with a computing device and lighting hardware modules. Briefly described, and according to one embodiment, aspects of the present disclosure generally relate to systems and methods for providing adjustable lighting that utilizes sensors and imaging devices of the vehicle to intelligently illuminate a particular object, location, or zone within an interior of the vehicle.

According to one embodiment, a system includes a processor and a non-transitory computer-readable medium storing instructions that, when executed by the processor, cause the processor to perform operations including determining a current state of a vehicle, the current state determined based on information from sensors, receiving a lighting control signal based on the information received from the sensors, and activating an adjustable and controllable spotlight based on the lighting control signal.

According to a further embodiment, a method includes determining, by a processor, a current state of a vehicle, the current state determined based on information from sensors, receiving, by the processor, a lighting control signal based on the information received from the sensors, and activating, by the processor, an adjustable and controllable time multiplexed spotlight based on the lighting control signal.

According to another embodiment, an apparatus includes a processor to determine a current state of a vehicle, the current state determined based on information from sensors, receive a lighting control signal based on the information received from the sensors, and activate N time multiplexed adjustable and controllable spotlights, each spotlight produced in a respective timeslot based on the lighting control signal.

According to another embodiment, a vehicle includes a positioning sensor, a lighting module configured to illuminate a zone of the vehicle, and a processor. The processor is configured to identify a current location of the vehicle using the positioning sensor, and in response to determining that the vehicle has previously been at the current location and that illumination of the zone was previously requested at the current location, send a command to activate the lighting module to illuminate the zone.

According to another embodiment, a method includes identifying, by a processor, a current location of the vehicle based on information from one or more sensors associated with the vehicle. In response to determining that the vehicle has previously been at the current location and that a lighting module of the vehicle was previously activated at the current location, the method includes sending a command to activate the lighting module to illuminate a first zone within the vehicle. The method includes identifying, by the processor, a destination location toward which the vehicle is traveling based on information from the one or more sensors. In response to determining that the vehicle is approaching the destination location, the method includes sending a command to activate the lighting module to gradually illuminate a second zone within the vehicle.

According to another embodiment, lighting module in a vehicle includes lighting elements and a controller configured to receive a control signal that identifies a user as present in the vehicle. The controller is configured to, in response to the control signal associated with user presence, send a command to one or more of the lighting elements to illuminate a first zone of the vehicle where the user is present, receive a control signal that identifies that illumination of a second zone of the vehicle was previously requested by the user at a current location of the vehicle, and in response to the control signal associated with the current location, send a command to one or more of the lighting elements to illuminate the second zone.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1E illustrates an adjustable spotlight illuminating an object in two schematic drawings according to example embodiments.

DETAILED DESCRIPTION

Figure 1A:
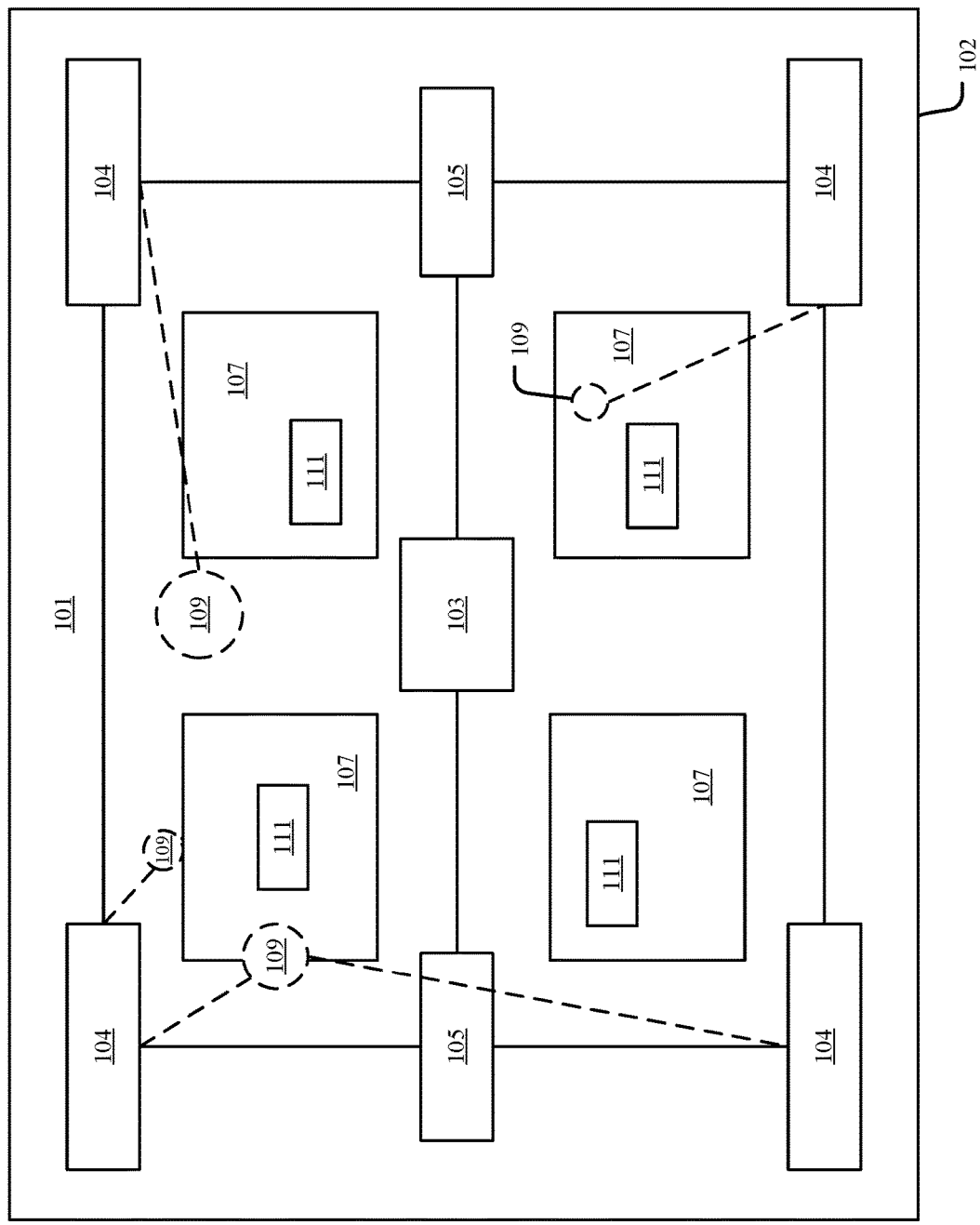
FIGS. 1A-1B illustrate block diagrams of a vehicle system according to example embodiments.

According to an example embodiment, an environment, such as a vehicle, includes a lighting system that determines objects, locations, and zones within the vehicle to illuminate while minimizing disturbance to vehicle occupants. The lighting system recognizes the objects, locations, and zones within the vehicle to be illuminated and responds to explicit requests or commands for illumination or anticipates implicit requests or commands for illumination. The lighting system automatically and dynamically adds and/or subtracts lighting to a location associated with an occupant, object, or zone.

In one embodiment, the lighting system provides adjustable spotlights that receive signals from or otherwise communicate with sensors and imaging devices of the vehicle to intelligently illuminate a particular object, location, or zone within an interior of the vehicle. In another embodiment, the lighting system that provides the adjustable spotlights includes mechanisms to respond to explicit and implicit commands from occupants of the vehicle such as verbal commands, gesture-based commands, and touch-based commands.

In an embodiment, the lighting system may include lighting hardware modules for activating and controlling the adjustable spotlights. The lighting hardware module may include a light emitting diode (LED) array, a lens, a translation stage, a moving mirror, and an optical fiber bundle. The lighting hardware module may provide an adjustable focal length and adaptive optics. In a further embodiment, the lighting hardware module may be a lighting source such as a liquid crystal display, an organic light emitting diode (OLED) display, a LED array, a projection display, or another pre-defined lighting panel. The projection display may be based on one of an LED digital light processing (DLP) light modulator, a micro-LED array, a laser scanner, and an LED liquid crystal (LC) light modulator, among others.

As an example, when an object is dropped onto a floor of the vehicle, the lighting system may automatically illuminate the dropped object and track a hand of the occupant as the occupant reaches for the object.

As another example, if an occupant is located in a rear zone of the vehicle and is illuminated by an adjustable spotlight, the lighting system may detect that the occupant is closing their eyes and drifting to sleep, e.g., the system may monitor a baby or toddler in a safety seat that is falling asleep. The lighting system may automatically and gradually turn the adjustable spotlight off to not disturb the occupant.

As a further example, an occupant may be located in a front zone of the vehicle while the vehicle is autonomously traveling from a first location to a second location at night. As the vehicle begins to approach the destination, the vehicle may automatically and gradually turn an adjustable spotlight on to gradually wake the occupant of the vehicle.

As an additional example, an occupant may be located in a rear zone of the vehicle while the vehicle is traveling from a first location to a second location. The lighting system may be providing soft lighting above a seat of the occupant. The lighting may be based on where the occupant is sitting, where the occupant is looking, and other factors such as ambient light. The lighting system may detect that the occupant is closing their eyes and drifting to sleep. The lighting system may automatically turn the lighting off.

In some embodiments, lighting may be location based. As an example, in a location known to the vehicle, and where illumination has been previously requested, the vehicle may illuminate all zones within the vehicle. In addition, in a location known to the vehicle and previously associated with storage lighting or otherwise associated with storage lighting, the vehicle may illuminate a storage area of the vehicle. In contrast, in a location unknown to the vehicle, the vehicle may not illuminate a storage area of the vehicle.

The vehicle and the lighting system may also accept a request or command such as gestures captured by imaging devices or touch screens, voice commands captured by microphones, and touch commands received by a touch screen. The lighting system responds to both explicit and implicit commands and controls lighting hardware modules based on the explicit and implicit commands. When an occupant enters the vehicle, the vehicle may determine that the occupant is a known occupant and activate the lighting hardware modules based on lighting personal profile settings associated with the occupant. In particular, this particular occupant may desire that the lighting hardware modules provide soft lighting in the front seats of the vehicle while not providing any lighting to a rear portion of the vehicle. After entering the vehicle and sitting in a seat in the front of the vehicle, the occupant may accidentally drop their mobile computing device onto the floor. The lighting system may automatically illuminate the floor and track the occupant's eyes and/or hands as they reach for the mobile computing device.

In another example, the lighting system may automatically detect that the occupant placed a briefcase, handbag, gym bag, or the like into the rear portion of the vehicle and gently laid the bag onto the floor. Over time, the vehicle may learn that the occupant usually places their bag onto the floor. The lighting system performs machine learning to detect placement of this bag, and does not illuminate it.

In another example, the vehicle may automatically detect that the occupant has opened a book or a newspaper, and thus intends to read the book or newspaper. The vehicle may have a database of objects to be illuminated that are detectable, such as the book or newspaper. Over time, the vehicle may learn that the occupant usually reads while the vehicle is in motion and the lighting system may provide task lighting onto pages of the book or newspaper.

In an additional example, the vehicle may learn over time that a child is seated in a child seat located in a rear zone of the vehicle. A parent of the child may help get the child seated and secured in the child seat each morning, for example, and the lighting system may provide a soft spotlight onto the child seat in the rear zone of the vehicle.

In a further example, a passenger unknown to the vehicle, but a guest of the occupant, may enter the vehicle and sit in a rear portion of the vehicle. The passenger may be previously unknown to the vehicle, but known to the occupant.

The passenger of the occupant may want to read a map. A known occupant or the unknown passenger may provide an audible command.

For example, either may state "vehicle please turn on the lights" and upon recognition of the verbal command, the vehicle may activate the lights in a rear portion of the vehicle.

While discussed in the context of a vehicle, the system may also be useful for residential building lighting, office lighting, commercial building lighting, or any other dynamic lighting environments.

The vehicle and/or a mobile computing device in communication with the vehicle may obtain biometric attributes of a person or occupant, and compare those biometric attributes with stored biometric attributes, using sensors and/or cameras or other imaging devices. The biometric attributes may be stored in memory of the mobile computing device and/or memory of the vehicle. The biometric attributes may be obtained and authenticated when the occupant approaches the vehicle and/or when the occupant is located within the vehicle. For example, the vehicle may determine that the occupant and/or a known mobile computing device is within a particular proximity of the vehicle. When a person has authenticated biometric attributes, the vehicle may illuminate lights within the vehicle when the mobile computing device is within the particular proximity of the vehicle. The lights may illuminate particular locations, objects (e.g., a seat), or zones. In certain instances, the vehicle may illuminate a particular zone or zones based on a location of the vehicle.

In an exemplary embodiment, seating arrangements within the vehicle may be rearranged and a seat may be moved from one location to another location. A seat may be rearranged from facing a front of the vehicle to a rear of the vehicle or from facing one side of the vehicle to another side of the vehicle. The vehicle may determine that the occupant has adjusted their seat and may illuminate lights appropriately. In certain instances, the vehicle may switch from illuminating a first particular zone or zones to a second particular zone or zones, or may switch from illuminating a first particular location or locations to a second particular location or locations within the vehicle.

In a further embodiment, the vehicle may determine that the mobile computing device is within the vehicle or that a particular occupant is within the vehicle and set vehicle personal preferences. According to an example embodiment, the vehicle personal preferences may be associated with lighting profile preferences, seating position, seat heating, seat cooling, steering wheel heating/cooling, and localized climate controls. The lighting system may automatically illuminate adjustable spotlights for a particular person sitting in a particular seat.

Users can benefit from use of vehicle personal preferences and personal data provided by the mobile computing device when operating the vehicle. For example, the personal data can be used to provide the vehicle with lighting profile preferences, media, contact lists, navigation locations, navigation settings, energy usage settings, autonomous functionality settings, security settings, other climate control settings, other entertainment settings, and seat settings, among others. Accordingly, use of such personal data enables users to influence and control delivered content, and vehicle operation, among other things.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

According to exemplary embodiments, the vehicle may provide adjustable, controllable, and dynamic spotlighting that responds to explicit and implicit commands. The vehicle does not place a significant burden on the user and offers significant lighting enhancements and conveniences for occupants of the vehicle.

These and other embodiments are discussed below with reference to FIGS. 1A-5. However, those skilled in the art will readily appreciate that the detailed description given herein with respect to these Figures is for explanatory purposes only and should not be construed as limiting.

FIG. 1A illustrates a block diagram of a vehicle system 100 according to an example embodiment. The vehicle system 100 includes a vehicle 102 having a computing device 103 that is in communication with sensors 105 and lighting hardware modules 104. The sensor 105 may include sensors and imaging devices, among other hardware devices for determining various attributes of the vehicle or occupants. The vehicle 102 may be a machine that transports people and/or cargo including a terrestrial motor vehicle, a watercraft, and an aircraft, among other vehicles. The vehicle 102 may include an engine or a motor such as an internal combustion engine, an electric motor, or a hybrid configuration.

As shown in FIG. 1A, the vehicle 102 may include an environment 101 with zones 107 that may be illuminated by any given lighting hardware module 104 or combination of modules, and/or combination of modules and general wide area illumination. The entire area of the vehicle may be illuminable. There may be occupants 111 such as a person located in each zone 107. The lighting hardware modules 104 may together create and control adjustable spotlights 109 illuminating particular locations and particular zones 107 within the vehicle. The adjustable spotlights 109 may have an adjustable shape, profile, position, intensity, size, and color, among other adjustable attributes.

Figure 1B:
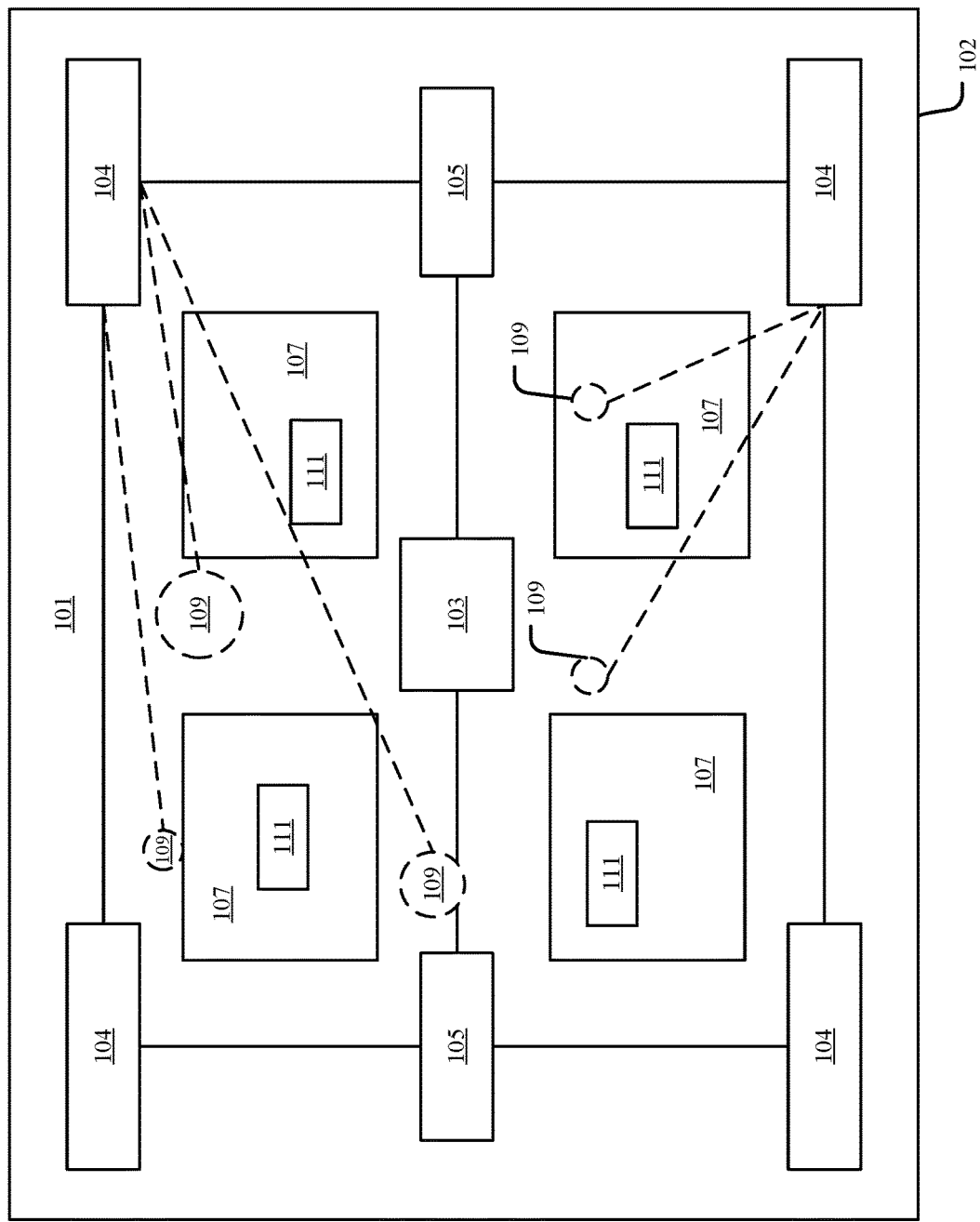

As shown in FIG. 1B, one lighting hardware module 104 may create and control adjustable spotlights 109 illuminating particular locations and/or particular zones 107 in the vehicle 102. The lighting hardware module 104 may provide spotlights 109 that are time multiplexed or modulated in a number of different locations faster than a user may perceive. The lighting hardware module 104 may simultaneously produce N spotlights 109 having varied shapes, profiles, positions, intensities, sizes, and colors, among other adjustable attributes. As an example, the N spotlights 109 may be time multiplexed at a rate roughly greater than 200 Hz wherein each spotlight has a timeslot and each spotlight is produced in its respective timeslot.

A first spotlight 109 may be produced in a first location in a front left of the vehicle 102 near a first occupant 111 and a second spotlight 109 may be produced in a second location in a front right of the vehicle near a second occupant 111. The first occupant 111 may be a driver of the vehicle 102 and the second occupant 111 may be a passenger of the vehicle. The first location and the second location may be simultaneously illuminated. In addition, the lighting for the second location and/or the first location may be turned on or off without affecting the lighting for the other location.

A third spotlight 109 may be produced in a third location in a back left of the vehicle 102 near a third occupant 111 and a fourth spotlight 109 may be produced in a fourth location in a back right of the vehicle 102 near a fourth occupant 111. The single lighting hardware module 104 may provide the N adjustable spotlights that are time multiplexed.

There may be seats located in each zone 107 among other vehicle components such as a roof, windshields, dashboards, windows, tables, armrests, and footrests, among other components.

The vehicle 102 and the computing device 103 may communicate in various ways or combinations thereof. The vehicle 102 and the computing device 103 may use wired communication methods and Bluetooth, WiFi, or other such short range wireless methods.

The vehicle 102 and the computing device 103 may communicate using a cellular communications network or another communications network. Accordingly, communication may involve the Internet, an intranet, a cellular communications network, a WiFi network, a packet network, a short-range wireless network, or another wired and/or wireless communication network or a combination of any of the foregoing. As an example, the vehicle 102 and the computing device 103 may communicate data in packets, messages, or other communications using a common protocol, e.g., Hypertext Transfer Protocol (HTTP) and/or Hypertext Transfer Protocol Secure (HTTPS). The vehicle 102 and/or the computing device 103 may communicate with other optional server computing devices associated with the vehicle system 100.

The vehicle 102 and/or the computing device 103 may also optionally include Bluetooth® Low Energy (BLE, Bluetooth® LE, Bluetooth® Smart) functionality based on the Bluetooth 4.0 specification or another specification. In addition, the vehicle 102 may include a beacon. According to an example embodiment, the vehicle 102 and the computing device 103 are paired and communicate wirelessly using a short range wireless network, e.g., Bluetooth® (IEEE Standard 802.15). The short range wireless network may be a wireless personal area network (WPAN).

In another example, the vehicle 102 may optionally create a personal area network and/or a mesh network for communicating with the computing device 103. Additionally, the vehicle 102 and the computing device 103 may communicate using Zigbee®, Wi-Fi, near field magnetic inductance, sonic (sound) waves, ultrasound waves, and/or infrared (light) waves, among others.

Figure 1C:
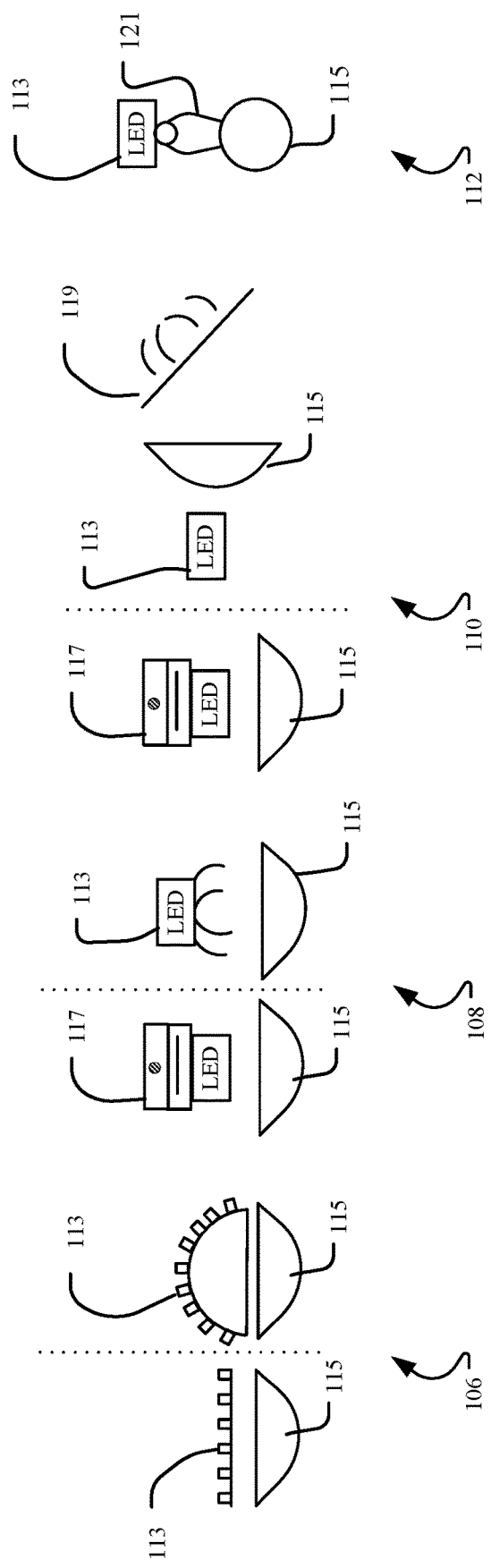
FIGS. 1C-1D illustrate lighting hardware modules according to example embodiments.
Figure 1D:
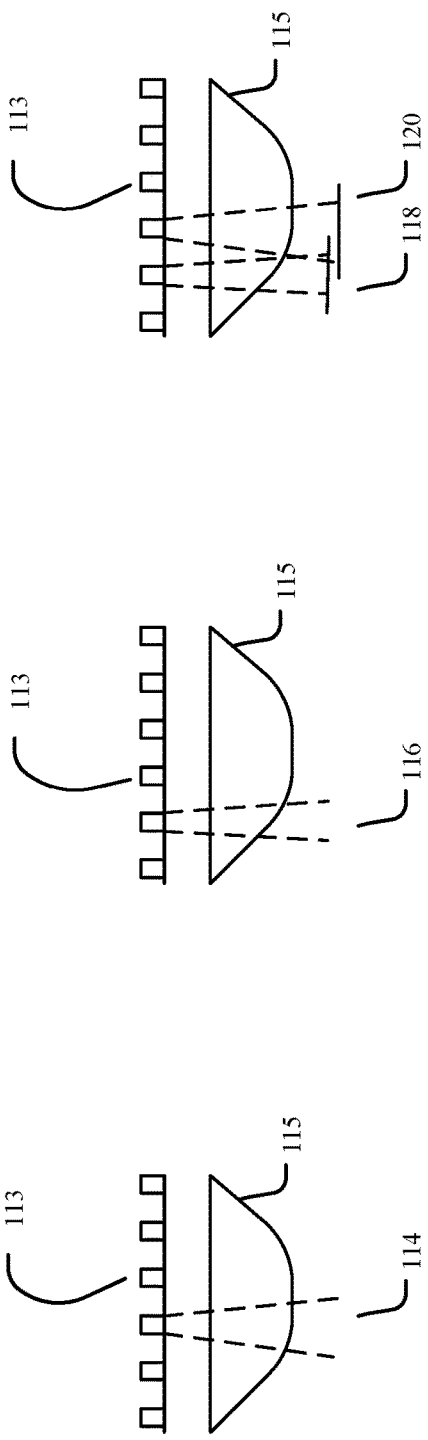

FIGS. 1C-1D illustrate seven representative section views of lighting hardware modules of the vehicle system 100 according to various possible example embodiments. Each of the lighting hardware modules shown in FIGS. 1C-1D may be used to provide and control adjustable spotlights 109 having a tunable spot size, location, intensity, shape, and color, alone or in various combinations. The lighting hardware modules may be positioned, in one embodiment, sufficiently to individually or in some combination, provide spot or task illumination in the interior of the vehicle 102.

As shown in FIG. 1C, there is a first example lighting hardware module 106 associated with the vehicle system 100 that includes a one dimensional (1D) or two-dimensional (2D) light emitting diode (LED) or micro-LED array 113 that is located on a planar surface or a two-dimensional curved surface that may be attached to or otherwise operably coupled with a lens 115. The array of LEDs 113 may have a particular or variable offset (among discrete LEDs of the array) and may be located on a planar surface or a compound curve surface. In addition, each LED, whether a single LED or member of an array of LEDs, may be a white LED, an RGB LED, or color LED. The lens 115 may be a varioptic lens for varying focus. The position and shape of the spotlight 109 may be tuned, adjusted, and modified by turning on and off individual LEDs (e.g., individually controlling each LED or a group of LEDs) within the array 113.

A second example lighting hardware module 108 associated with the vehicle system 100 includes an LED (or other lighting element) 113 coupled with a translation stage 117. The LED element may be a single LED, an LED array 113 as described in the first example lighting hardware module, and may include a lens 115 as described in the first example lighting hardware module. The array of LEDs 113 may be mounted on a uni-directional, a bi-directional, or a tri-directional translation stage 117. The stage 117 is under processor control to move the stage position (and coupled LED element) to provide spotlighting, task-lighting, and wide area lighting. The position and shape of the spotlight 109 can be tuned, adjusted, and modified by translating the LED array 113 and/or turning on and off individual LEDs within the array.

A third example lighting hardware module 110 associated with the vehicle system 100 includes various possible LED elements 113 and a translation stage 117, such as those described in the first example lighting hardware module and the second example lighting hardware module, or a moving mirror 119 instead of or in addition to the stage 117 operably coupled with a varioptic lens 115. As a result, the third example lighting hardware module 110 provides an adjustable focal length. The varioptic lens 115 allows the spotlight 109 to focus on objects that are located near the lighting hardware module and at more distant locations from the lighting hardware module. The third example lighting hardware module 110 provides a spotlight 109 that can be tuned, adjusted, and modified as in the first example lighting hardware module and the second example lighting hardware module. In addition, the third example lighting hardware module 108 may provide collimated light and adjust the spotlight beam collimation.

A fourth example lighting hardware module 112 associated with the vehicle system 100 includes the 2D LED array 113 as described in the first, second, and third lighting hardware module that is connected to an optical fiber bundle taper 121, and the lens 115 as described in the first, second, and third lighting hardware modules. The fiber bundle taper 121 is used to combine the outputs of multiple LEDs of the LED array 113 and may be attached to the LED array and/or the lens using transparent glue or bonding materials.

The LED array 113 of the first, second, third, and fourth lighting hardware modules may shine light onto the lens 115, which is a tunable molecular liquid-crystal lens. The focal length may be controlled by adjusting an orientation of liquid crystals associated with the lens. The lens 115 enables tuning the shape, profile, and position of the spotlight 109.

The LEDs may be small, e.g., approximately 10 μm micro-LEDs. This may enable the fill factor of the LED array 113 to be low so that the LED array appears transparent. If the liquid crystal lens is flat, it also may appear as transparent. Therefore, the adjustable spotlight 109 may be essentially invisible or nearly invisible so that it may be integrated into a transparent glass panel of the vehicle 102. This may allow the first, second, third, and fourth lighting hardware modules to be integrated into glass of the vehicle 102 or any other location in the vehicle including the frame of the vehicle 102.

As an example, the lighting hardware module 104 may be embedded within a roof of the vehicle, a window portion of the vehicle, a headrest of the vehicle, a floor of the vehicle, a seat of the vehicle, a support beam of the vehicle, and/or in other locations. The vehicle 102 may include lighting hardware modules 104 mounted within the roof to illuminate directly onto seats, lighting hardware modules 104 mounted on or near the floor of the vehicle to illuminate footwells, and lighting hardware modules 104 mounted to support beams of the vehicle to illuminate door handles.

One lighting hardware module 104 may be used to illuminate more than one occupant or generate more than one adjustable spotlight 109. As an example, the lighting hardware module 104 located in a front of the vehicle 102 may modulate between two different occupants 111 or zones 107 or between two adjustable spotlights 109 to generate the two adjustable spotlights. A first lighting hardware module 104 may simultaneously illuminate a left-front side of the vehicle and a right-front side of the vehicle. In addition, a second lighting hardware module 104 may provide additional lighting for the left-front side of the vehicle. The left-front side of the vehicle may be brighter or may have a larger spotlight than the right-front side of the vehicle.

FIG. 1D shows three different examples of a 2D LED array of a lighting hardware module. In one lighting hardware module, a third LED 114 of the 2D array 113 is illuminated, shining light onto the lens 115. In another lighting hardware module, a second LED 116 of the 2D array 113 is illuminated, shining light onto the lens 115. In an additional lighting hardware module, a second LED 118 of the 2D array 113 and a third LED 120 of the 2D array 113 are illuminated, shining light onto the lens 115 and providing an overlapping illumination.

FIG. 1E shows two schematic drawings 122, 124 of an example of an adjustable spotlight 109 illuminating an object 128 located on a floor 126 of the vehicle 102.

As shown in drawing 122, an occupant 111 may have opened a door 134 of the vehicle 102 to find a misplaced object 128. The sensors 105 determine that the object 128 has fallen onto the floor or footwell 126 of the vehicle 102 below a seat 132 and the lighting hardware modules 104 automatically illuminate a location associated with the object 128 with an adjustable spotlight 109. In this case, the vehicle 102 may determine that this object 128 is a foreign object not normally located in this particular location. The sensors 105 track the arm/hand 130 and gaze of the occupant 111 as the occupant picks up the object 128 on the floor 126 of the vehicle 102. After the object 128 is picked up, the sensors 105 may detect the absence of the object, and may turn the adjustable spotlight 109 off after a particular period of time.

As shown in drawing 124, an occupant 111 may be seated on a seat 132 within the vehicle 102 and may have dropped an object 128 onto the floor 126 and to the right of a vehicle console 136. The sensors 105 determine that the object 128 has fallen onto the floor or footwell 126 of the vehicle below the seat 132 and the lighting hardware modules 104 automatically illuminate a location associated with the object with an adjustable spotlight 109. In this case, the vehicle 102 may determine that this object 128 is a foreign object not normally located in this particular location. The sensors 105 track the arm/hand 130, the leg/foot 138, and the gaze of the occupant 111 as the occupant picks up the object 128 on the floor 126 of the vehicle 102. After the object 128 is picked up, the sensors 105 may detect the absence of the object, and may turn the adjustable spotlight 109 off after the particular period of time.

Figure 2:
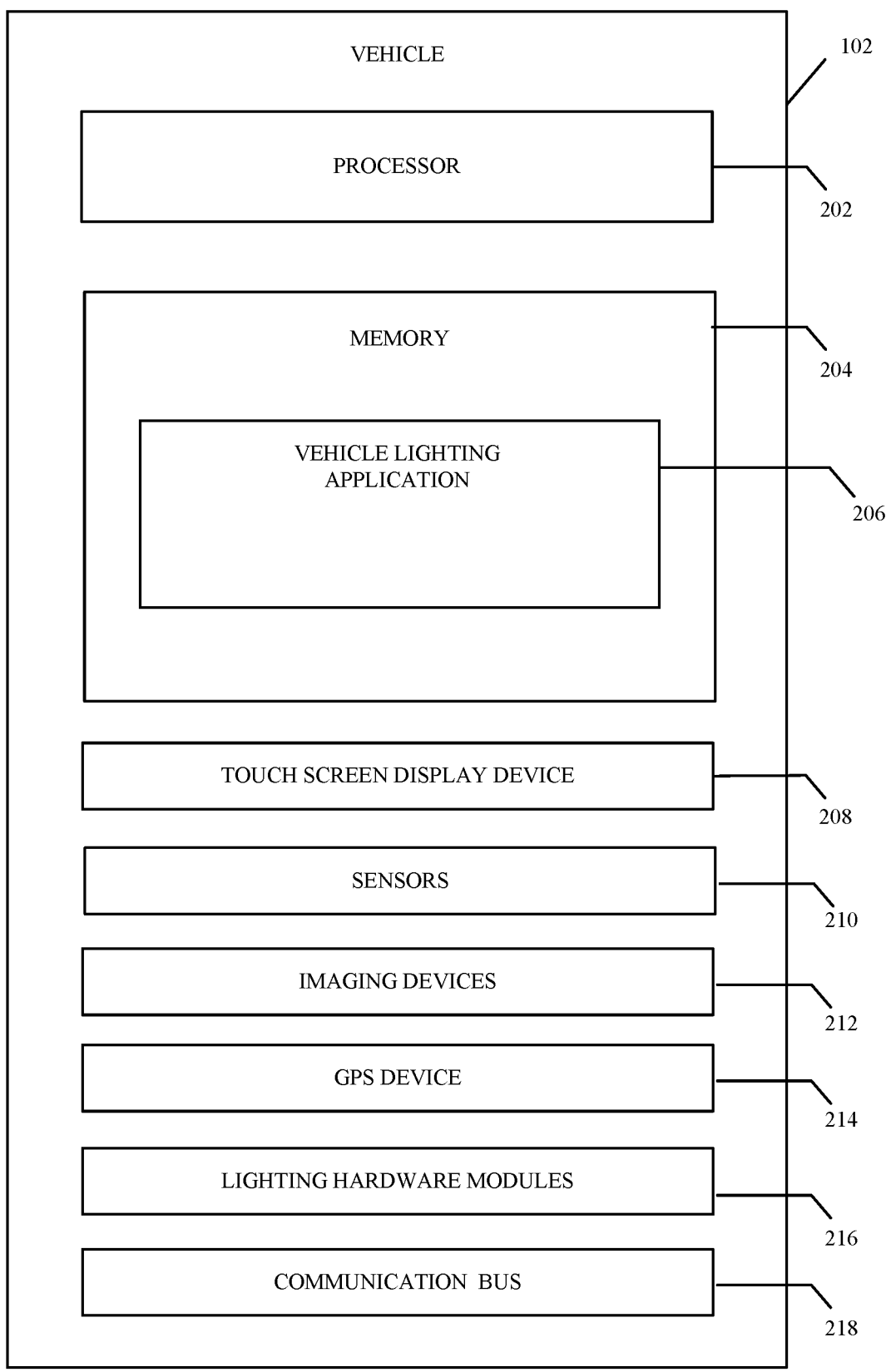
FIG. 2 illustrates a block diagram of a vehicle computing system according to an example embodiment.

FIGS. 1A, 1B, and 2 illustrate a block diagram of the vehicle 102 according to an example embodiment. The vehicle 102 may include a computing device having a hardware component including a processor 202 and memory 204, such as a vehicle onboard computer or a dedicated electronic device having a processor and memory. The processors 202 process machine/computer-readable executable instructions and data, and the memory 204 stores machine/computer-readable executable instructions and data including applications, such as a vehicle lighting application 206. The processor 202 and memory 204 are hardware. The processor 202 may be a hardware processing unit. In one embodiment, the processor 202 includes a secure enclave processor (SEP). The SEP stores and protects information used for identifying known mobile computing devices, biometric information, and lighting preference profiles for occupants, among other information. The memory 204 includes random access memory (RAM) and non-transitory memory, e.g., a non-transitory computer-readable storage medium such as flash storages or hard drives. The non-transitory memory may include any tangible computer-readable medium including, for example, magnetic and/or optical disks, flash drives, and the like.

The vehicle 102 further can include touch screen display devices 208, such as a liquid-crystal display (LCD) for receiving input and displaying output, sensors 210, cameras or imaging devices 212, a global positioning system (GPS) device 214, lighting hardware modules 216, and a communication bus 218. The vehicle 102 may include other wireless communication devices for communicating including a wireless transceiver, a cellular transceiver, a Bluetooth transceiver, and others.

The touch screen display devices 208 may be located on an exterior of the vehicle and/or an interior of the vehicle for receiving input and displaying output including lighting control buttons. The lighting control buttons may be provided by a user interface of the vehicle 102 and/or a user interface of a mobile computing device in communication with the vehicle 102. For example, the touch screens 208 may be located within an interior of the vehicle. The sensors 210 and the imaging devices 212 may be used for biometric identification and authentication. The sensors 210 may be located on the exterior of the vehicle and/or the interior of the vehicle and include fingerprint sensors, iris recognition devices, eye vein verification devices, microphones, seat pressure sensors, load or weight sensors (e.g., a strain gauge), pressure sensors, ambient light sensors (ALS), electrocardiogram (ECG) sensors, and infrared (IR) antennas, among others. The sensors 210 may be coupled with the processor 202 for obtaining biometric information.

The imaging devices 212 may be coupled with the processor 202 for facial recognition. The imaging devices 212 include high-definition cameras and may be used to determine two-dimensional images and/or three-dimensional images including a two-dimensional image of a face or a three-dimensional image of a face, a height of a person, a body shape of a person, or a gait of a person. The imaging devices 212 may be located on an exterior of the vehicle and/or an interior of the vehicle. In one example, each seat within the vehicle may include imaging devices to capture a face of a passenger sitting in that particular seat. The touch screen display devices 208 and/or the imaging devices 212 may be used to receive lighting control input regarding an object, zone, location, or emission area and gestures, such as a pinch, pull, zoom, or a gesture pointing to an object, zone, location, or emission area, among other gestures. The microphones may be used to receive verbal commands such as lighting control related to an object, location, zone, or emission area.

The global positioning system device 214 may receive GPS signals and thereby determine a current location of the vehicle 102. The lighting hardware modules 216 may include one first lighting hardware module located in a front-right portion of the vehicle 102, one second lighting hardware module located in a front-left portion of the vehicle 102, one third lighting hardware module located in a rear-right portion of the vehicle 102, and a fourth lighting hardware module located in a rear-left portion of the vehicle 102. However, the lighting hardware modules 216 may be arranged in other ways such that the lighting hardware modules 216 eliminate shadowing of objects and/or occupants and can properly illuminate locations and zones within the vehicle. The vehicle 102 may include more than four lighting hardware modules 216 or less than four lighting hardware modules 216.

The vehicle 102 may be in communication with other computing devices such as mobile computing devices carried by occupants of the vehicle. The mobile computing device may be a computer having a processor and memory, such as a laptop, desktop, tablet computer, mobile computing device (e.g., a smartphone), a wearable device (e.g., a watch), or a dedicated electronic device having a processor and memory. The processors process machine/computer-readable executable instructions and data, and the memory stores machine/computer-readable executable instructions and data including applications, such as a client application that communicates with the vehicle lighting application 206. The processor and memory are hardware. The processor may be a hardware processing unit. In one embodiment, the processor includes a secure enclave processor (SEP). The SEP stores and protects biometric information and lighting preference profile information, among other information. The memory includes random access memory (RAM) and non-transitory memory, e.g., a non-transitory computer-readable storage medium such as flash storages or hard drives. The non-transitory memory may include any tangible computer-readable medium including, for example, magnetic and/or optical disks, flash drives, and the like.

The mobile computing device further includes a touch screen display device such as a liquid-crystal display (LCD) to receive input and display output, sensors such as an ambient light sensor, an accelerometer, a gyroscopic sensor, microphones, a magnetometer, a barometer, and a fingerprint sensor, cameras or imaging devices, a GPS device, and a communication bus. The mobile computing device may include other wireless communication devices for communicating including a wireless transceiver, a cellular transceiver, a Bluetooth transceiver, and others.

The touch screen display device receives input and displays output. The sensors and the imaging devices may be used for biometric identification and authentication. The sensors may be in communication with the processor 202 for obtaining biometric information. The imaging devices may include high-definition cameras and may be used to determine two-dimensional images and/or three-dimensional images including a two-dimensional image of a face or a three-dimensional image of a face, a height of a person, a body shape of a person, or a gait of a person. The touch screen display device and/or the imaging devices may be used to receive gestures. They also may be used to receive verbal commands. The global positioning system device may continually determine a current location of the mobile computing device.

The vehicle lighting application 206 may have a component of an application and/or service executable by the vehicle 102 and/or the mobile computing device. For example, the vehicle lighting application 206 may be a single unit of deployable executable code. According to one aspect, the vehicle lighting application 206 may be a web application, a native application, and/or a mobile application (e.g., an app) downloaded from a digital distribution application platform that allows users to browse and download applications developed with mobile software development kits (SDKs).

As an example, the vehicle 102 may receive a communication from a known mobile computing device, determine, by a sensor 210, biometric information associated with the known occupant, grant access to the vehicle 102, and set vehicle personal preferences including lighting preferences based on the communication and the biometric information. The biometric information may be facial recognition information and/or another type of biometric information. The vehicle 102 may unlock doors and extend welcome functions including external lighting, internal lighting, cabin configuration, and other welcome functions. The vehicle may illuminate the external lighting and/or the internal lighting when the occupant 111 and/or the mobile computing device is a particular distance from the vehicle, e.g., one meter. The particular distance may be modified and may be based on a particular location of the vehicle 102.

In another example, a person 111 may touch a door handle or door of the vehicle 102 to provide the biometric authentication information. The door handle or the door may have a fingerprint sensor and/or other sensors for obtaining a fingerprint and/or other signals. The vehicle 102 may then compare the biometric information associated with the person with biometric attributes stored in memory 204 of the vehicle 102 and/or memory of the mobile computing device. The person may enter the vehicle 102 and sit in a driver seat or a passenger seat.

Figure 3:
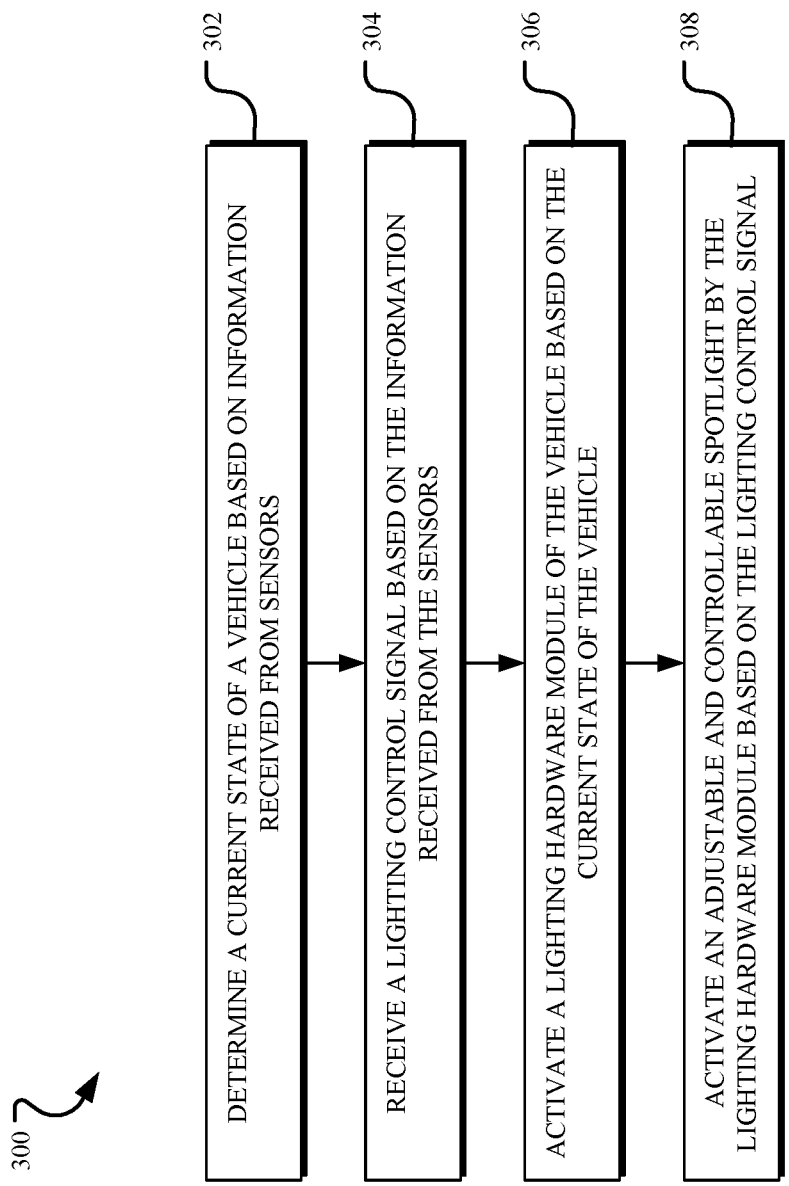
FIG. 3 illustrates a flowchart for activating and controlling adjustable lighting within a vehicle according to an example embodiment.

FIG. 3 illustrates a flowchart of a process 300 for activating and controlling adjustable lighting within a vehicle according to an example embodiment. The process 300 shown in FIG. 3 begins at operation 302. In 302, the vehicle 102 determines a current state of the vehicle based on information received from the sensors 210, the imaging devices 212, and the GPS device 214. The current state of the vehicle 102 may include a current state of each zone 107 of the vehicle. The current state may be based on explicit commands and implicit commands in addition to lighting personal preferences of occupants 111 in the vehicle. The sensors 210 and imaging devices 212 may execute a feedback loop and continually determine whether objects are located in each zone 107 of the vehicle and determine whether any changes occur in the current state. Based on the feedback loop, the lighting hardware modules 216 may provide anticipatory lighting that dynamically and automatically adjusts to the determined changes.

In 304, the lighting hardware modules 216 receive a lighting control signal from the vehicle 102 based on the information received from the sensors 210, the imaging devices 212, and the GPS device 214. As an example, the sensors 210 and the imaging devices 212 may determine that a current state of the vehicle has changed in a zone 107 of the vehicle and lighting hardware modules 216 may be activated to illuminate an object, location, or zone in the vehicle.

After determining that the current state of the vehicle has changed in zones 107 of the vehicle, in 306, the vehicle 102 activates lighting hardware modules 216 based on the current state of the vehicle as determined by the sensors 210, the imaging devices 212, and the GPS device 314. The lighting hardware module may be one of the examples described with reference to FIG. 1C. In particular, the lighting hardware module may include an LED array, a translation stage, and a lens. As an example, an occupant 111 may have approached the vehicle, entered the vehicle, and sat down in a seat. The vehicle 102 may illuminate a location associated with the seat. In another example, the sensors 210 and the imaging devices 212 may detect that the occupant 111 has opened a book. In another example, the sensors 210 and the imaging devices 212 may detect that an occupant 111 has fallen asleep or is resting. As another example, the sensors 210 and the imaging devices 212 may detect that a child 111 is crying. The sensors 210 and imaging devices 212 may detect that a heart rate of a passenger 111 is changing, may detect that eyes are closing, and may detect other changing biometric factors. In a further example, an occupant 111 may have exited the vehicle. The sensors 210 and imaging devices 212 may detect the absence of the occupant 111 and may deactivate the lighting hardware module 216 and turn off the lighting.

In 308, the lighting hardware module 216 activates an adjustable and controllable spotlight 109 based on the lighting control signal. The adjustable and controllable spotlight 109 may be an adjustable and controllable time multiplexed spotlight or N time multiplexed spotlights, each spotlight produced in a respective timeslot based on the lighting control signal. Based on the examples described above, if the occupant 111 has sat down in the seat, the lighting hardware module 216 may activate a spotlight that is based on the personal lighting preferences of the occupant. If the occupant 111 has fallen asleep or the occupant is crying and a spotlight is shining on the occupant, the lighting hardware module 216 may gradually turn the spotlight off. The adjustable and controllable spotlight 109 may be activated based on one of an explicit command and an implicit command. In other words, the lighting control signal may be based on one of the explicit command and the implicit command. The vehicle lighting application 206 may receive an explicit lighting command, and the explicit lighting command may be one of a gesture activated command, a voice activated command, and a touch command. In response to the command, the vehicle lighting application 206 activates the lighting hardware module 216 based on the explicit lighting command. The vehicle lighting application 206 also may receive an implicit command. The implicit command is based on a change in the current state. In response to the command, the vehicle lighting application 206 activates the lighting hardware module 216. Based on the explicit command and/or the implicit command, the lighting hardware module 216 controls a shape, a profile, a position, an intensity, a size, and a color of illumination. In another example, the implicit command may be based on intent of an occupant 111 based on eyes of an occupant, a head of an occupant, a hand of an occupant, a body position of an occupant, and a gaze of an occupant as determined by the sensors 210 and the imaging devices 212. The vehicle lighting application 206 may activate the lighting hardware module 216 based on the intent of the occupant 111 or the perceived intent of the occupant. The intent may be determined by determining a vector from a finger or hand from the occupant and/or a vector to the eyes of the occupant.

Figure 4:
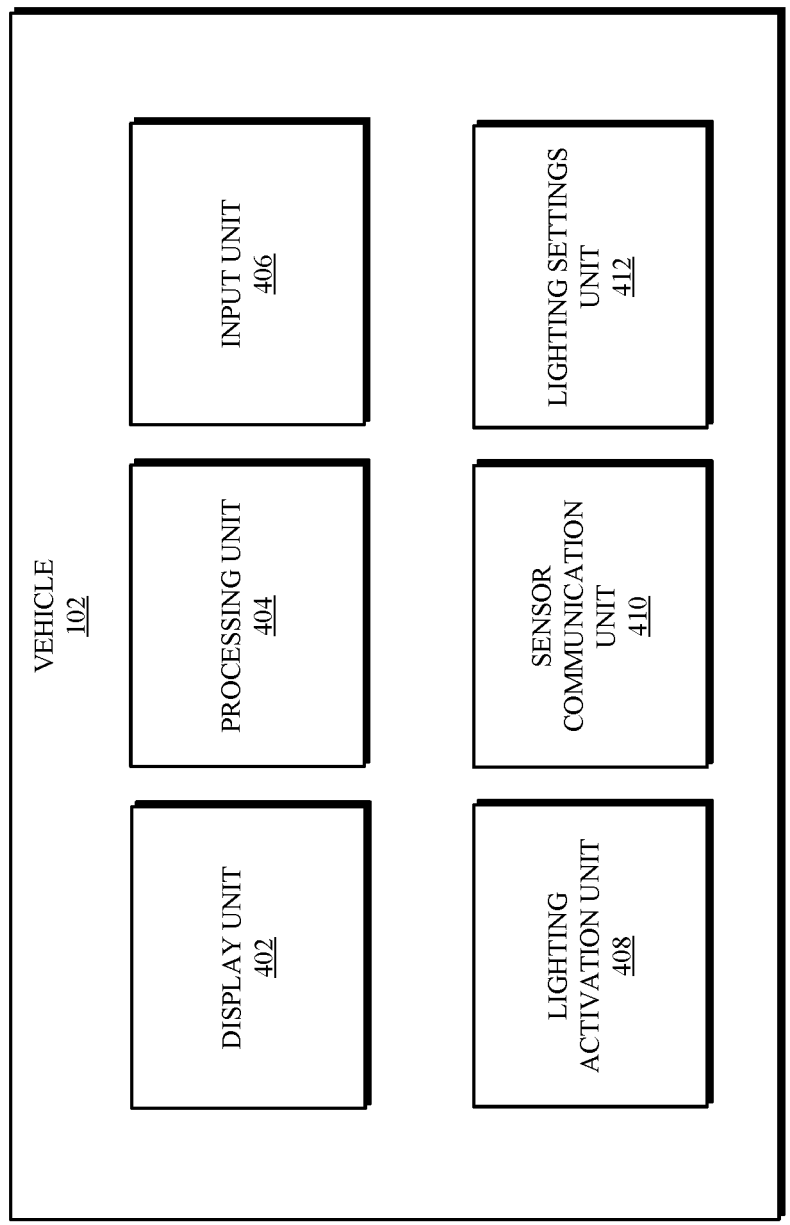
FIG. 4 illustrates a functional block diagram of an electronic device associated with the vehicle including operational units arranged to perform various operations of the presently disclosed technology.

Turning to FIG. 4, the vehicle 102 including operational units 402-412 arranged to perform various operations of the presently disclosed technology is shown. The operational units 402-412 may be provided by the vehicle lighting application 206 and may communicate with the mobile computing device. The operational units 402-412 of the vehicle 102 are implemented by hardware or a combination of hardware and software to carry out the principles of the present disclosure. It will be understood by persons of skill in the art that the operational units 402-412 described in FIG. 4 may be combined or separated into sub-blocks to implement the principles of the present disclosure. Therefore, the description herein supports any possible combination or separation or further definition of the operational units 402-412.

In one implementation, the vehicle 102 includes a display unit 402 configured to display information, such as a graphical user interface, and a processing unit 404 in communication with the display unit 402 and an input unit 406 configured to receive data from input devices or systems. Various operations described herein may be implemented by the processing unit 404 using data received by the input unit 406 to output information for display using the display unit 402.

Additionally, in one implementation, the vehicle 102 includes units implementing the operations described with respect to FIG. 3. For example, the operations 302, 304, 306, and 308 may be implemented by a lighting activation unit 408, a sensor communication unit 410, and a lighting settings unit 412. The lighting activation unit 408, the sensor communication unit 410, and the lighting settings unit 412 may together activate and control the lighting hardware module 216 based on explicit and implicit lighting commands. As an example, the lighting activation unit 408 may include an explicit lighting command unit and an implicit lighting command unit.

The sensor communication unit 410 may include a biometric authentication unit that communicates with the sensors 210 and the imaging devices 212. The biometric authentication unit may use a biometric matching engine for receiving biometric information from the sensors 210, the imaging devices 212, and comparing the biometric information with the information stored in the vehicle memory 204 and the memory in the processor 202. The biometric authentication unit determines whether the biometric information matches known biometric information (e.g., comparing the representation of a face to known faces) and provides a determination of match or no match. Each known face may be first stored when an occupant 111 approaches and/or enters the vehicle 102 or at another time. The biometric authentication unit may make the determination based on a particular location of the vehicle. Based on the determination, the lighting settings unit 412 may determine whether there are personal lighting profile preferences associated with an occupant 111.

The sensor communication unit 410 also may include an object authentication unit that communicates with the sensors 210 and the imaging devices 212. The object authentication unit may use an object matching engine for receiving object information from the sensors 210, the imaging devices 212, and comparing the object information with the object information stored in the vehicle memory 204 and the memory in the processor 202. The object authentication unit determines whether the object information matches known object information (e.g., comparing a representation of a book with a known representation of a book) and provides a determination of match or no match. As a result, the object authentication unit and the biometric authentication unit provide machine learning capabilities for the vehicle 102.

Figure 5:
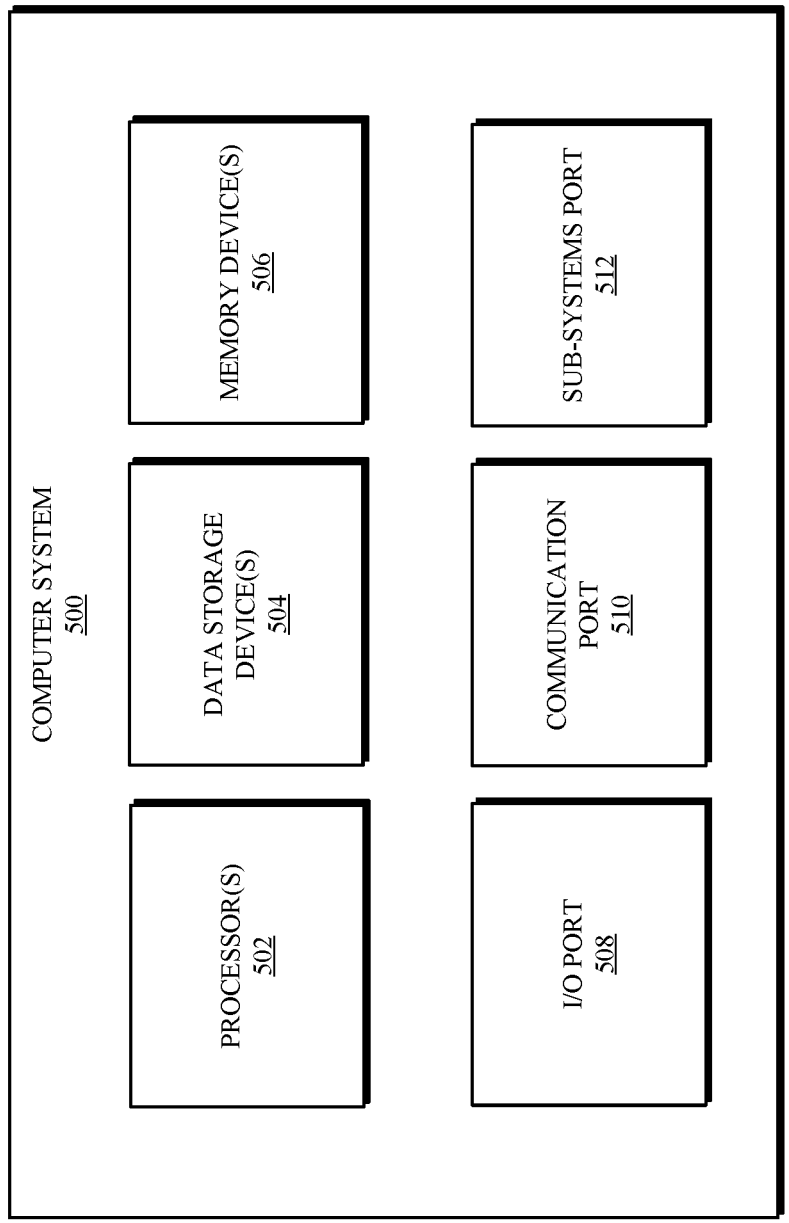
FIG. 5 is an example computing system that may implement various systems and methods of the presently disclosed technology.

Referring to FIG. 5, a detailed description of an example computing system 500 having computing units that may implement various systems and methods discussed herein is provided. The computing system 500 may be applicable to the vehicle 102 and the mobile computing device and other computing or network devices. It will be appreciated that specific implementations of these devices may be of differing possible specific computing architectures not all of which are specifically discussed herein but will be understood by those of ordinary skill in the art.

The computer system 500 may be a computing system that is capable of executing a computer program product to execute a computer process. Data and program files may be input to the computer system 500, which reads the files and executes the programs therein. Some of the elements of the computer system 500 are shown in FIG. 5, including hardware processors 502, data storage devices 504, memory devices 506, and/or ports 508-512. Additionally, other elements that will be recognized by those skilled in the art may be included in the computing system 500 but are not explicitly depicted in FIG. 5 or discussed further herein. Various elements of the computer system 500 may communicate with one another by way of communication buses, point-to-point communication paths, or other communication means not explicitly depicted in FIG. 5.

The processor 502 may include, for example, a central processing unit (CPU), a microprocessor, a microcontroller, a digital signal processor (DSP), and/or internal levels of cache. There may be processors 502, such that the processor 502 comprises a single central-processing unit, or processing units capable of executing instructions and performing operations in parallel with each other, commonly referred to as a parallel processing environment.

The computer system 500 may be a conventional computer, a distributed computer, or any other type of computer, such as external computers made available via a cloud computing architecture. The presently described technology is optionally implemented in software stored on the data storage device(s) 504, stored on the memory device(s) 506, and/or communicated via the ports 508-512, thereby transforming the computer system 500 in FIG. 5 to a special purpose machine for implementing the operations described herein. Examples of the computer system 500 include personal computers, terminals, workstations, mobile phones, tablets, laptops, personal computers, multimedia consoles, gaming consoles, set top boxes, and the like.

The data storage devices 504 may include any non-volatile data storage device capable of storing data generated or employed within the computing system 500, such as computer executable instructions for performing a computer process, which may include instructions of both application programs and an operating system (OS) that manages the various components of the computing system 500. The data storage devices 504 may include, without limitation, magnetic disk drives, optical disk drives, solid state drives (SSDs), flash drives, and the like. The data storage devices 504 may include removable data storage media, non-removable data storage media, and/or external storage devices made available via a wired or wireless network architecture with such computer program products, including database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 504 and/or the memory devices 506, which may be referred to as machine-readable media. It will be appreciated that machine-readable media may include any tangible non-transitory medium that is capable of storing or encoding instructions to perform any of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the executable instructions or data structures.

In some implementations, the computer system 500 includes ports, such as an input/output (I/O) port 508, a communication port 510, and a sub-systems port 512, for communicating with other computing, network, or vehicle devices. It will be appreciated that the ports 508-512 may be combined or separate and that more or fewer ports may be included in the computer system 500.

The I/O port 508 may be connected to an I/O device, or other device, by which information is input to or output from the computing system 500. Such I/O devices may include, without limitation, input devices, output devices, and/or environment transducer devices.

In one implementation, the input devices convert a human-generated signal, such as, human voice, physical movement, physical touch or pressure, and/or the like, into electrical signals as input data into the computing system 500 via the I/O port 508. Similarly, the output devices may convert electrical signals received from computing system 500 via the I/O port 508 into signals that may be sensed as output by a human, such as sound, light, and/or touch. The input device may be an alphanumeric input device, including alphanumeric and other keys for communicating information and/or command selections to the processor 502 via the I/O port 508. The input device may be another type of user input device including, but not limited to: direction and selection control devices, such as a mouse, a trackball, cursor direction keys, a joystick, and/or a wheel; sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 500 via the I/O port 508. For example, an electrical signal generated within the computing system 500 may be converted to another type of signal, and/or vice-versa. In one implementation, the environment transducer devices sense characteristics or aspects of an environment local to or remote from the computing device 500, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 500, such as, physical movement of some object (e.g., a mechanical actuator), heating or cooling of a substance, adding a chemical substance, and/or the like.

In one implementation, a communication port 510 is connected to a network by way of which the computer system 500 may receive network data useful in executing the methods and systems set out herein as well as transmitting information and network configuration changes determined thereby. Stated differently, the communication port 510 connects the computer system 500 to communication interface devices configured to transmit and/or receive information between the computing system 500 and other devices by way of wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. Such communication interface devices may be utilized via the communication port 510 to communicate with other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 510 may communicate with an antenna for electromagnetic signal transmission and/or reception. In some examples, an antenna may be employed to receive Global Positioning System (GPS) data to facilitate determination of a location of a machine, vehicle, or another device.

The computer system 500 may include a sub-systems port 512 for communicating with systems related to a vehicle to control an operation of the vehicle 102 and/or exchange information between the computer system 500 and sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, vehicle lighting information and software and other modules and services may be embodied by instructions stored on the data storage devices 504 and/or the memory devices 506 and executed by the processor 502. The computer system 500 may be integrated with or otherwise form part of a vehicle. In some instances, the computer system 500 is a portable device that may be in communication and working in conjunction with various systems or sub-systems of a vehicle.

The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

For the purpose of promoting an understanding of the principles of the present disclosure, reference was made to the embodiments illustrated in the drawings, and specific language was used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A vehicle, comprising:
a positioning sensor;
a lighting module configured to illuminate a zone of the vehicle; and
a processor configured to:
identify a current location of the vehicle using the positioning sensor; and
in response to determining that the vehicle has previously been at the current location and that illumination of the zone was previously requested at the current location, send a command to activate the lighting module to illuminate the zone.

2. The vehicle of claim 1, wherein the processor is configured to:

in response to determining that the current location is unknown to the vehicle using information from the positioning sensor, send a command to deactivate the lighting module.

3. The vehicle of claim 2, wherein the zone is a storage area of the vehicle or includes a child seat.

4. The vehicle of claim 1, wherein the processor is configured to:
using information from the positioning sensor, identify that the vehicle is traveling toward a destination location; and
in response to determining that the vehicle is approaching the destination location, send a command to activate the lighting module to gradually illuminate the zone.

5. The vehicle of claim 4, wherein the zone is a passenger cabin of the vehicle.

6. The vehicle of claim 1, wherein determining that illumination of the zone was previously requested at the current location includes identifying control inputs from a user of the vehicle previously received at the current location.

7. The vehicle of claim 1, wherein the processor is configured to:
using information from additional sensors associated with the vehicle, identify a user in the zone of the vehicle; and
in response to determining that the user is present in the zone, send a command to activate the lighting module to illuminate the zone.

8. The vehicle of claim 7, wherein the processor is configured to:
using information from the additional sensors, identify the user as absent from the zone of the vehicle; and
in response to determining that the user is absent from the zone, send a command to deactivate the lighting module.

9. A method, comprising:
identifying, by a processor, a current location of a vehicle based on information from one or more sensors associated with the vehicle;
in response to determining that the vehicle has previously been at the current location and that a lighting module of the vehicle was previously activated at the current location, sending a command to activate the lighting module to illuminate a first zone within the vehicle;
identifying, by the processor, a destination location toward which the vehicle is traveling based on information from the one or more sensors; and
in response to determining that the vehicle is approaching the destination location, sending a command to activate the lighting module to gradually illuminate a second zone within the vehicle.

10. The method of claim 9, wherein the first zone is a storage area of the vehicle or includes a child seat, and wherein the second zone is a front portion or a rear portion of a passenger cabin of the vehicle.

11. The method of claim 9, further comprising:
in response to determining that the current location is unknown to the vehicle, sending a command to deactivate the lighting module.

12. The method of claim 9, further comprising:
identifying, by the processor, a user in the first zone or the second zone of the vehicle based on information from the one or more sensors; and
in response to determining that the user is present in the first zone or the second zone, sending a command to activate the lighting module to illuminate the one of the first zone or the second zone where the user is present.

13. The method of claim 12, further comprising:
identifying, by the processor, that the user is absent from the first zone or the second zone of the vehicle; and
in response to determining that the user is absent from the first zone or the second zone, sending a command to deactivate the lighting module to darken the one of the first zone or the second zone where the user is absent.

14. A lighting module in a vehicle, comprising:
lighting elements; and
a controller configured to:
receive a control signal that identifies a user as present in the vehicle;
in response to the control signal associated with user presence, send a command to one or more of the lighting elements to illuminate a first zone of the vehicle where the user is present;
receive a control signal that identifies that illumination of a second zone of the vehicle was previously requested by the user at a current location of the vehicle; and
in response to the control signal associated with the current location, send a command to one or more of the lighting elements to illuminate the second zone.

15. The lighting module of claim 14, wherein the first zone is a front portion or a rear portion of a passenger cabin of the vehicle and the second zone is a storage area of the vehicle or includes a child seat.

16. The lighting module of claim 14, wherein the controller is configured to:
receive a control signal that identifies the user as absent from the vehicle; and
in response to the control signal associated with user absence, send a command to deactivate the one or more lighting elements that illuminate the first zone or the second zone.

17. The lighting module of claim 14, wherein the controller is configured to:
receive a control signal that identifies that the current location is an unknown location; and
in response to the control signal associated with the unknown location, send a command to deactivate the one or more lighting elements that illuminate the first zone or the second zone.

18. The lighting module of claim 14, wherein the controller is configured to:
receive a control signal that identifies that the vehicle approaches a destination location; and
in response to the control signal associated with the destination location, send a command to gradually change an illumination level in the first zone or the second zone.

19. The lighting module of claim 18, wherein the illumination level in the first zone or the second zone gradually increases as the vehicle approaches the destination location.

20. The lighting module of claim 14, wherein the lighting elements include one or more of an adjustable spotlight, a light emitting diode array, a lens, an optical fiber bundle, a translation stage, or a moving mirror.

* * * * *